United States Patent [19]

Pieper

[11] 4,264,351
[45] Apr. 28, 1981

[54] GLASS MELTING FURNACE

[75] Inventor: Helmut Pieper, Lohr, Fed. Rep. of Germany

[73] Assignee: Sorg GmbH & Co. KG, Lohr, Fed. Rep. of Germany

[21] Appl. No.: 2,113

[22] Filed: Jan. 8, 1979

[30] Foreign Application Priority Data

Jan. 12, 1978 [DE] Fed. Rep. of Germany ....... 2801117

[51] Int. Cl.³ ............................................. C03B 3/00
[52] U.S. Cl. ..................................... 65/335; 65/146; 414/165; 414/199; 414/206; 414/293
[58] Field of Search ....................... 65/335, 146, 160; 414/292, 199, 165, 206, 293

[56] References Cited

U.S. PATENT DOCUMENTS

| 1,870,636 | 8/1932 | McIntyre et al. | 65/335 X |
| 2,262,070 | 11/1941 | Turk | 65/160 X |
| 3,732,993 | 5/1973 | Csapo | 414/206 |

Primary Examiner—Arthur D. Kellogg
Attorney, Agent, or Firm—Sprung, Felfe, Horn, Lynch & Kramer

[57] ABSTRACT

A glass melting furnace, especially fully electrically heated glass melting furnace, comprising a wall of refractory material, said wall being circular or having the configuration of a regular polygon, and wherein a supporting frame is provided at the exterior side thereof, comprising a cover or roof of refractory material being supported by overlying tierods or beams including wheels travelling on an annular or circular track rail and permitting said roof to be rotated in a horizontal plane; bin means and conveyor means for feeding the batch material into at least one hopper positioned on said roof; and bin means and conveyor means for the controlled supply of the batch material from said hopper or hoppers into a slot or into openings formed in the refractory material of said roof with different radial spacings from the axis of rotation.

18 Claims, 5 Drawing Figures

GLASS MELTING FURNACE

The present invention relates to a glass melting furnace, especially fully electrically heated glass melting furnace, comprising a wall of refractory material, said wall being circular or having the configuration of a regular polygon, and said wall including a supporting frame at the exterior side thereof.

Glass melting furnaces of this type are well known, and these furnaces have proved to operate satisfactorily. The advantages of such glass melting furnaces do not only include the better utilization of energy than in conventional furnaces; rather, such furnaces are also suitable to melt glass of improved quality as compared to conventional furnaces, and these furnaces, in particular, emit smaller quantities of exhaust gas than oil or gas fired furnaces wherein the combustion exhaust gases add to the total amount of exhaust gases released. Furthermore, the construction of furnaces of this type is not complicated, and enables a structure having small dimensions.

However, in the case of certain types of mixtures or batch materials, it has been found to be disadvantageous in the conventional, fully electrically heated glass melting furnaces that the batch due to outgassing requirements of the melt is not permitted to cover the entire surface. Additionally, it is of disadvantage that such furnaces must have an open top or side wall because the batch must be loaded uniformly onto the surface of the melting bath, such that the exhaust gases formed in the melting operation cannot be collected at all, or with difficulty only, and released to the atmosphere through filtering systems. Also the exposed batch adds to the heat consumption of the furnace and may result in unfavorable vertical temperature distribution.

Also, it is of disadvantage in the conventional furnaces wherein the batch is uniformly fed onto an upwardly exposed surface, that the charging or feeding devices used are expensive and complicated in structure. The use of uncomplicated spreader arms for the spreading of the batch supplied to a given position, has proved to be unsatisfactory for some types of batch and the provision of a charging vessel or of conveyor means discharging a specific volume from above each individual point of the furnace surface area, is complicated, expensive and difficult. In this case, it is not only the mechanism providing for controlled advance to each separate point of the furnace that is complicated in structure; rather, control of the quantity discharged can be effected imperfectly only in mechanical respects.

In view of this prior art, it is the object of the present invention to provide a novel glass melting furnace, particularly a fully electrically heated glass melting furnace wherein, by avoiding the above-discussed drawbacks, the upper surface of the furnace is fully covered by a hanging cover or roof without thereby impeding the uniform feeding of the batch across the surface of the furnace.

Furthermore, the hanging roof of the furnace should be closed to allow for removal of the gases produced in melting the batch, the insulation should be sufficient to avoid unnecessary thermal losses from occurring, the temperature of the upper portion of the furnace should be controllable in accordance with the melting requirements, the hanging roof should lend itself to be constructed economically, easily and in a short period of time, and the conveyor means provided in the roof should permit the performance of the controlled or predeterminedly differentiated loading of the total, preferably circular surface (upper side) of the furnace. Thus, this construction should allow one to feed any desired quantity of batch to any point of the batch surface.

In accordance with the present invention, this object is solved by a glass melting furnace, especially a fully electrically heated glass melting furnace, comprising a wall of refractory material, said wall being circular or having the configuration of a regular polygon, and wherein a supporting frame is provided at the exterior side thereof. Also, this object is solved in that a cover or roof of refractory material being supported by overlaying tierods or beams including wheels traveling on an annular or circular track rail and permitting said roof to be rotated in a horizontal plane; bin means and conveyor means for feeding the batch material into at least one hopper positioned on said roof; and bin means and conveyor means for the controlled supply of the batch material from said hopper or hoppers into a slot or into openings formed in the refractory material of said roof with different radial spacings from the axis of rotation.

Further advantageous embodiments are disclosed herein.

Preferred embodiments of the present invention are described below by referring to the accompanying drawings, wherein.

Figure 1:
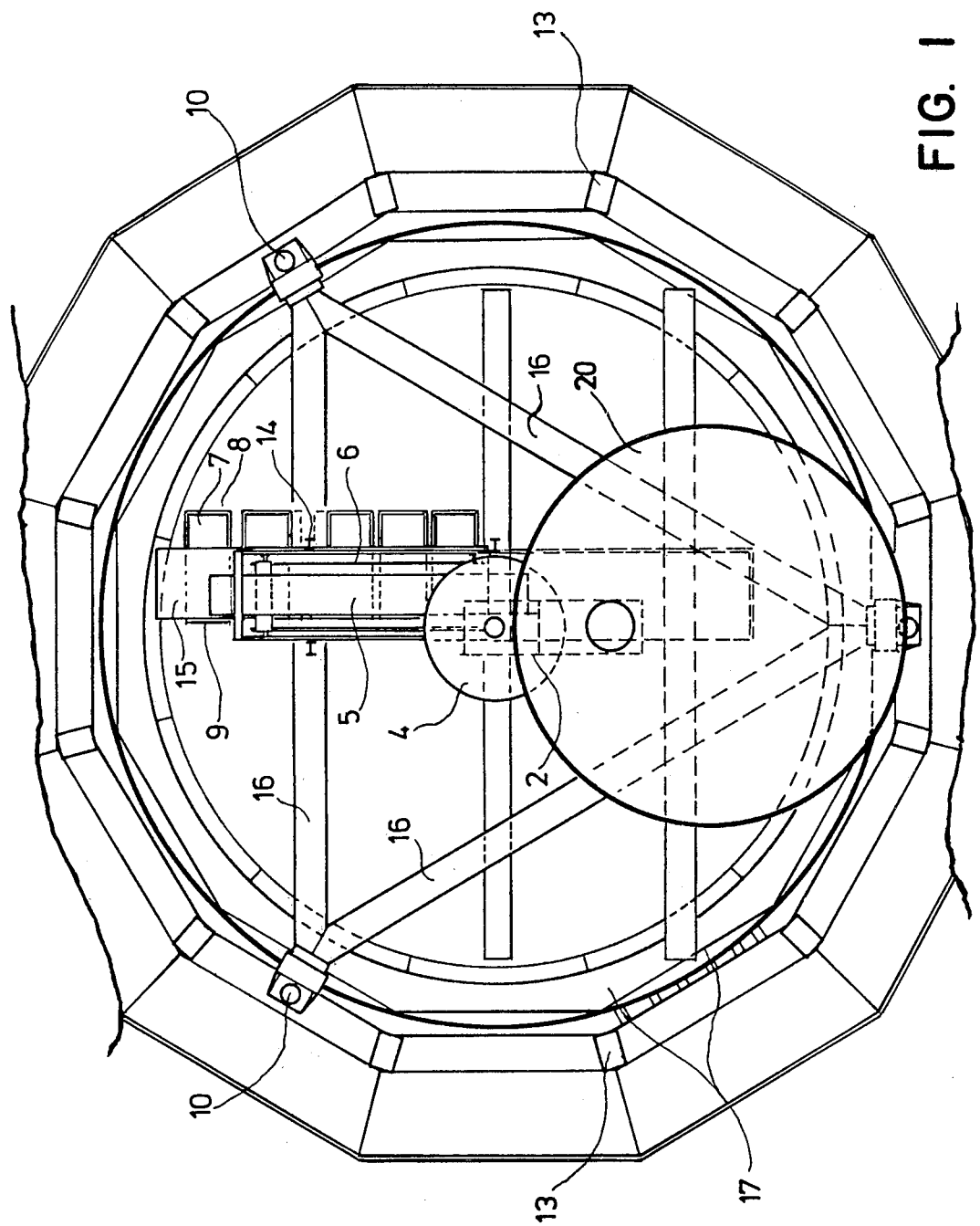
FIG. 1 shows a plan view of a glass melting furnace according to the present invention.
Figure 2:
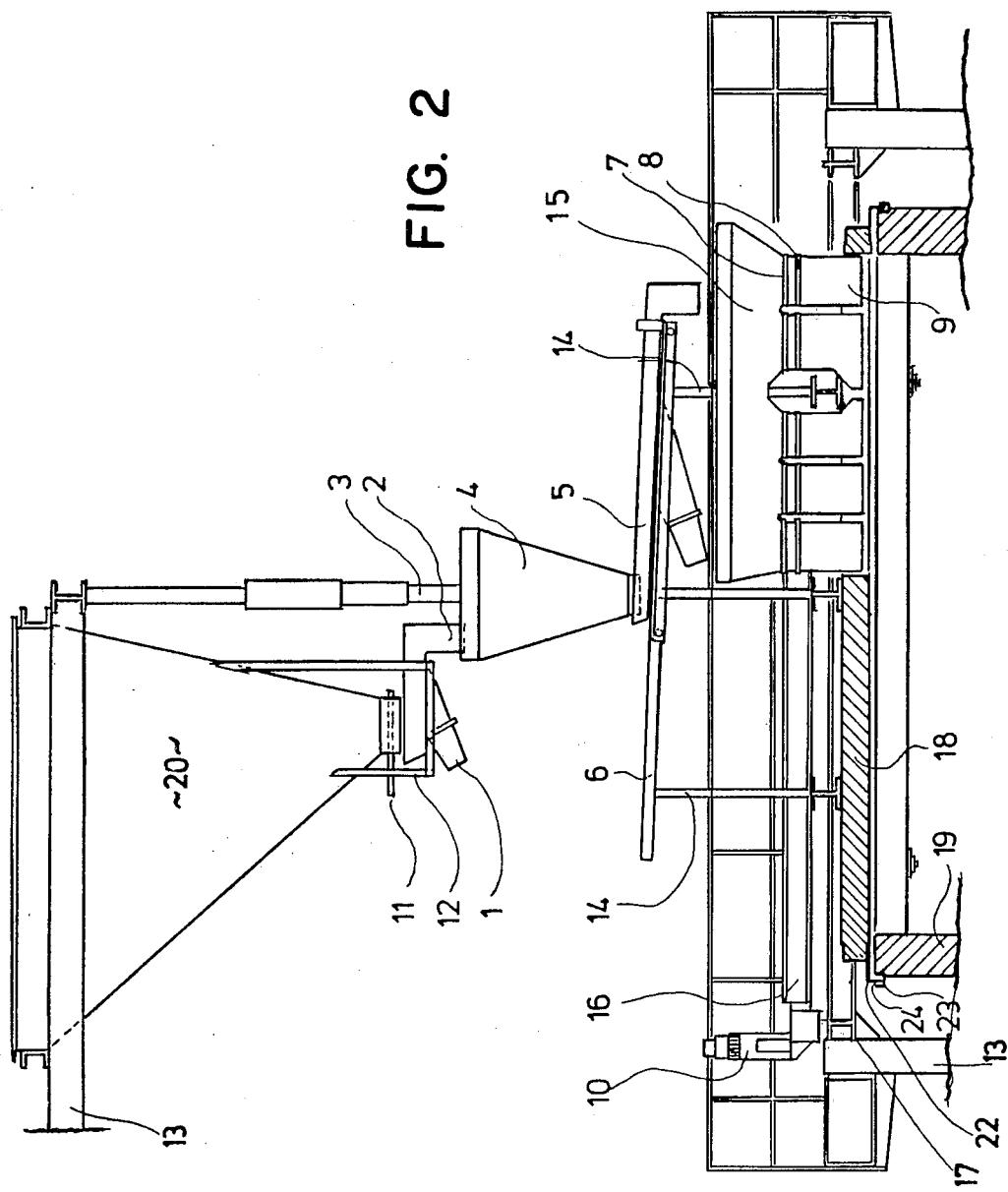
FIG. 2 is a vertical sectional view of the upper portion of the glass melting furnace according to FIG. 1.
Figure 3:
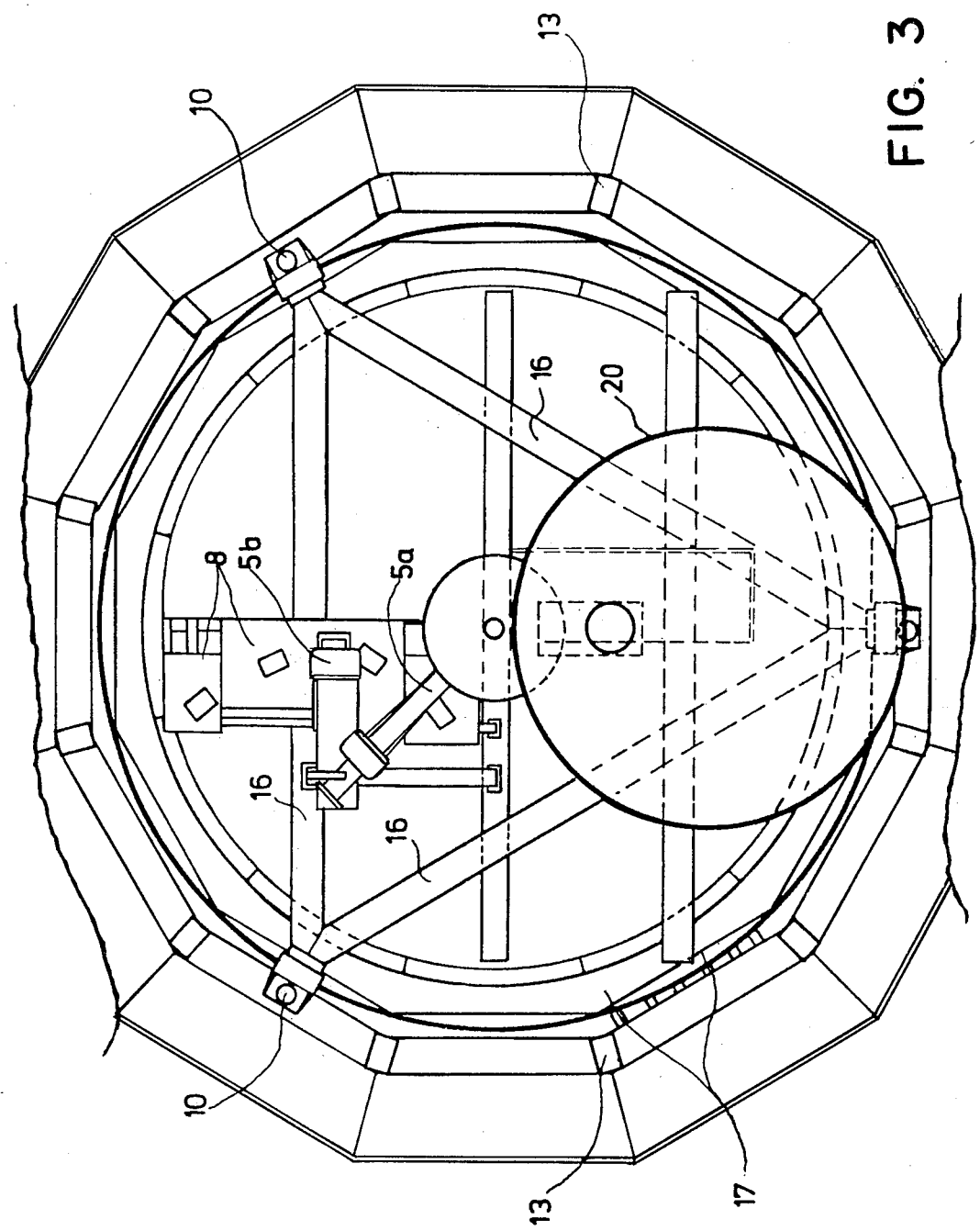
FIG. 3 is a plan view similar to FIG. 1 and showing a modified embodiment of the conveyor means having a radially variable discharge point.

As shown in FIGS. 1 to 3, the exemplified furnace comprises a furnace wall 19 in the configuration of a polygon having an integral number of corners. Above the blanket of batch material, a cover or roof 18 of refractory material is provided, which roof is supported through intermediate beams, by three beams 16 positioned in triangular configuration. This supporting structure is similar to that of suspended ceilings. The roof per se is constructed from refractory bricks 37 (FIG. 5) suspended from tiebolts 36. The furnace wall 19 is exteriorly provided with a supporting frame 13 carrying an annular or circular travelling rail 17 at the upper end thereof. Wheels or rollers 10 provide for rotary motion of the triangularly positioned beams 16 on the annular rail 17, with at least one wheel and preferably all three wheels 10 at the three corners being driven by suitable driving motors.

In the preferred embodiment, the supporting frame 13 supports a batch main bin 20 the lower end of which is provided with a flat slide valve 11 communicating with a metering vibratory chute 1 through a dust-proof hopper.

The batch main bin as well as components 11, 1 and 2 are stationarily mounted to the supporting frame 13, while the discharge end or position of the vibratory chute 1 is positioned above the upper opening of a hopper 4 centrally and concentrically mounted to the rotary roof 18, which hopper 4, however, includes an eccentrically disposed outlet; that is, the bottom outlet is displaced from the center axis of the rotary roof and of the hopper 4. This structure permits one to arrange a central power supply 3 in concentric relation to the center axis of the rotary roof without thereby reducing the cross-sectional area of the outlet opening of the hopper 4 or obstructing the advancing movement of a conveyor mechanism arranged therebelow. The central power supply also serves for transmitting the electric power for each driving mechanism of the rotary roof.

Below the non-central or eccentric outlet of the hopper 4, a radially movable distributor chute 5 is provided which is likewise formed by a vibratory chute or other feeding device. The feeding device 5 is provided with a plurality of wheels adapted to run longitudinally within a frame 6. Said frame may be inclined relative to the rotary roof, and since the hopper 4 and the vibratory chute 5 are stationarily mounted to the rotary roof, their relative position is maintained even during rotation of the complete roof; longitudinal movement thereof merely has the effect that the discharge position is radially displaced to and fro (FIGS. 1 and 2).

As shown in FIG. 3, the structure may be embodied also in such a way that the openings or outlets and the associated upstream tank bins 15 are disposed on a sector of a circle, with a vibratory chute 5b adapted to be rotated in a horizontal plane passing from the center of such sector to the bins 15, said chute being fed at its center of rotation mounted to the rotary roof by a vibratory pipe 5a which has the opposite end thereof fed with the batch material by the hopper 4. The chute 5b per se is adapted to discharge into each bin 15 if rotated correspondingly.

As the hopper 4 has its upper opening arranged in concentric relation to the rotary roof and securely connected to the latter, the rotary movement thereof has no bearing upon the discharge position of the metering vibratory chute 1 because this position is situated in the same peripheral region of the hopper 4.

Below the path of movement of the discharge position of the intermediate conveyor means, the upstream tank bins 15 are provided with a common, elongated inlet end, whereby the bins 15 may be loaded as demanded by conveyor means 5 or 5a to 5b independently of rotary movement of the rotary roof and of the position thereof.

Flat slide valves 7 are provided below each upstream tank bin 15, said slide valves being connected to five feeding vibratory chutes 9 through dust-proof hoppers 8. These vibratory chutes 9 for the supply of batch material onto or through the batch material blanket are arranged in a direction perpendicular to the direction of movement of the vibratory chute 5, and positioned directly above a slot formed in the rotary roof, with said slide valves being separately controlled in such a fashion that controlled coverage of the molten bath surface is obtained by rotary motion of the roof. Accordingly, the feed may be adjusted such that the outermost vibratory chutes 9 supply more material to the same ratio, as the length of their path of travel across the batch material layer exceeds the length of travel of the inner vibratory chutes 9. In such case, the ratio of the deliveries is equal to the ratio of the lengths of travel of the discharge points or ends of the vibratory chutes 9.

Alternatively, however, the feeding capacity of the chutes 9 may be adjusted such that a profile of the batch material is deposited which corresponds to the energy profile across the electrodes, such that, preferably, the chute disposed above the ends of the electrodes supplies a greater quantity of material than that which could be expected in view of the length of travel thereof.

Still further, the feeding capacity of all chutes or of some chutes may be varied even during the rotary motion. In this way, it becomes possible to obtain the most optimum coverage by batch material both within the annular zones and locally in dependency of the operating state of the furnace. The requisite data may be provided by the operators or by a computer.

In order to seal the rotary roof with the refractory material 18, this material includes at the outher edge thereof an annular apron 22 cooperating with a sealing edge 23 on or in the crown of the external wall 19. The sealing edge 23 is of U-shaped configuration and filled with a flowable or fluid sealng medium, with a vertically extending edge or rim of said apron 22 being immersed into such sealing medium. The sealing medium may comprise sand or another granular material; however, in order to provide for absolute tightness to steam or vapor, a highly heat resistant oil, bitumen, paraffin or the like may be used. The allowable temperature for such material may be easily adjusted by providing insulating layers between the sealing edge and the refractory material 19 of the wall.

Apparently, the rotary roof according to the invention not only permits to keep the upper side of the furnace sealed; rather, it is also possible with the aid of technically simple standard equipment of glass melting furnaces operating reliably to obtain an exact, uniform or contemplated non-uniform or even asymmetrical discharge of the batch materal onto the blanket present on the molten mass.

Figure 4:
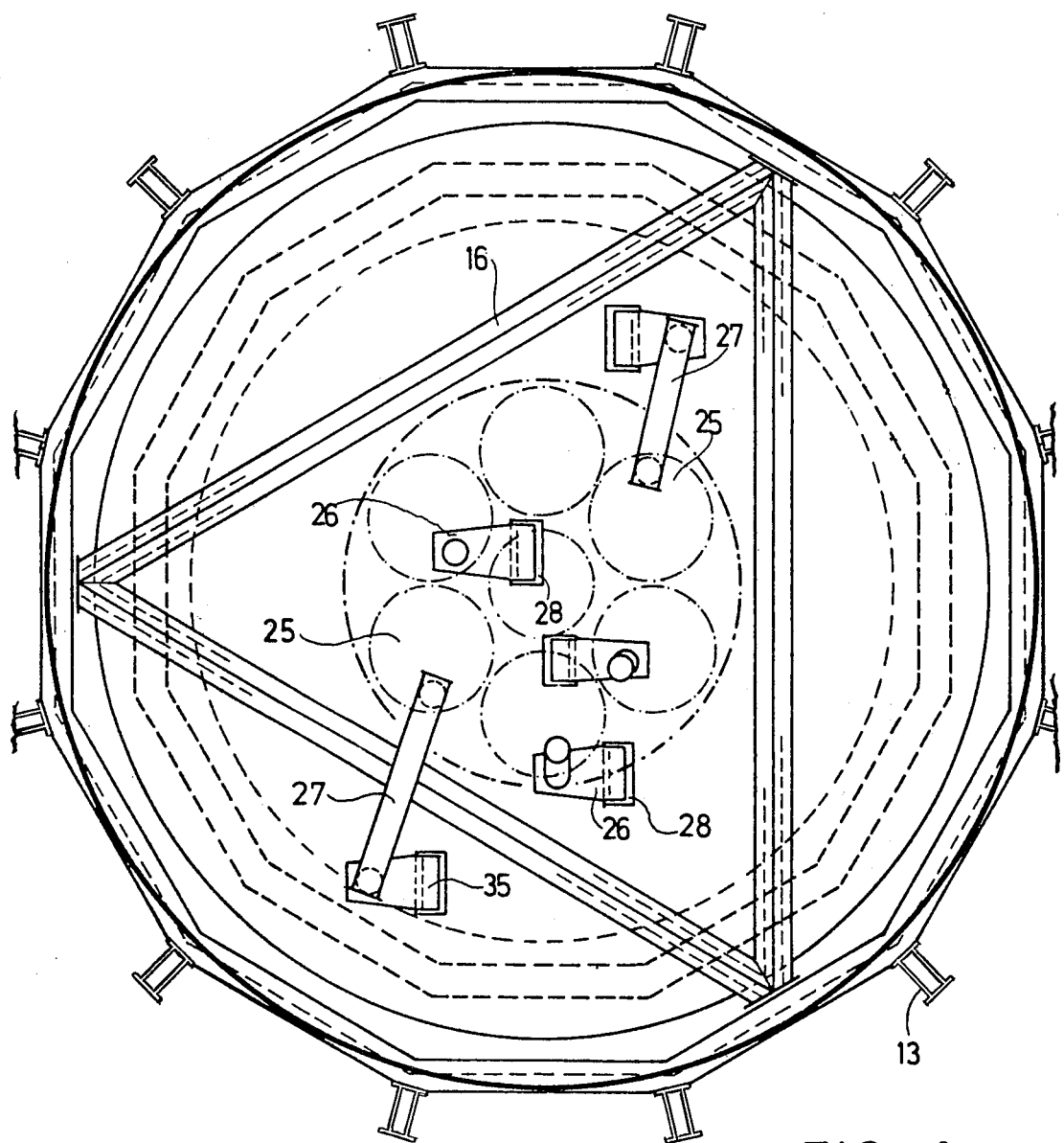
FIG. 4 is a plan view of a furnace according to the present invention showing a still further embodiment of the conveyor and bin means.
Figure 5:
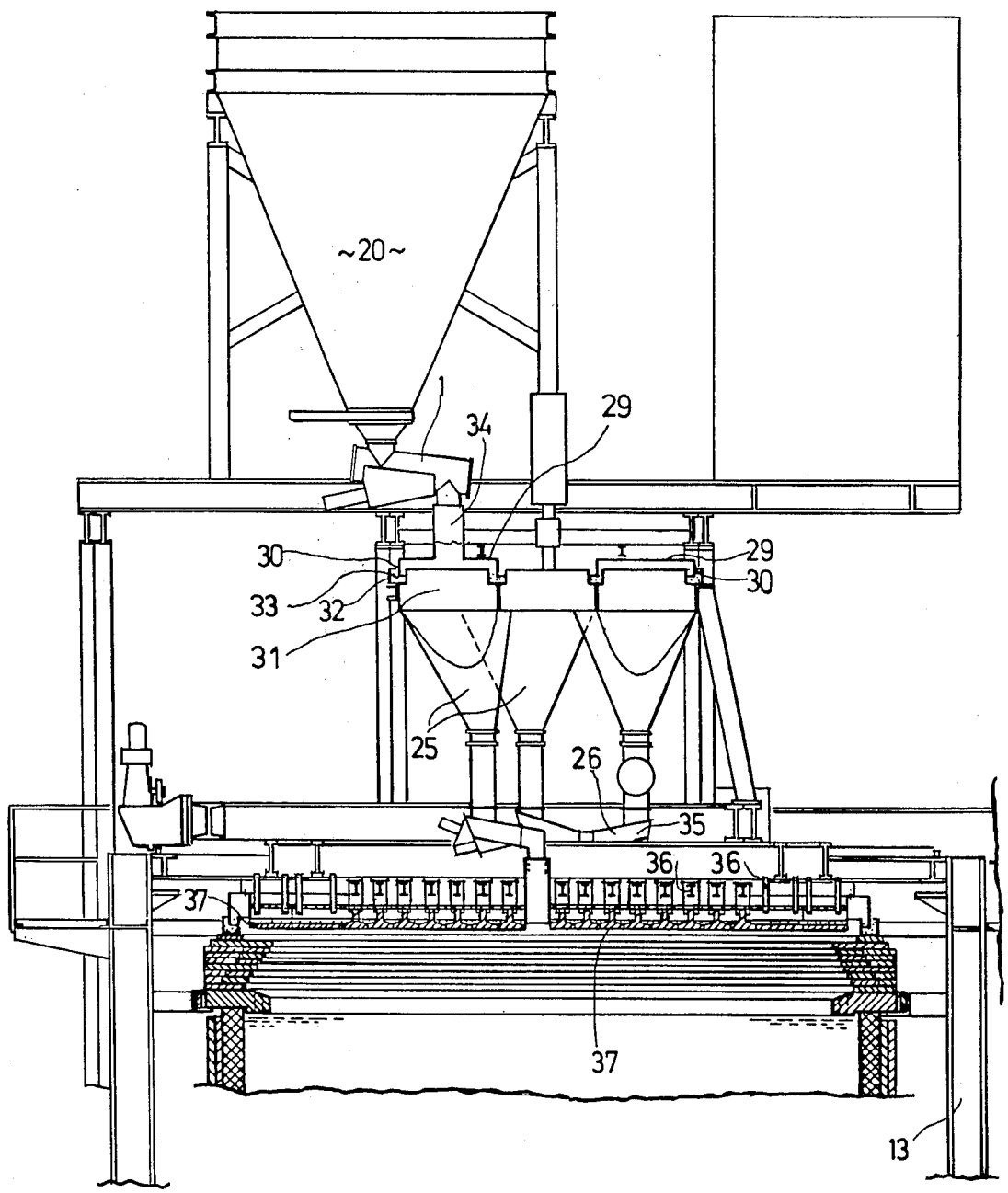
FIG. 5 is a vertical sectional view of the upper portion of the furnace according to FIG. 4.

As shown in FIGS. 4 and 5, the rotary roof may be constructed also in such a manner that a concentric hopper is not stationarily mounted to the rotary roof, but rather a plurality of hoppers 25 are provided on a circle concentric with the axis of rotation of the roof, with the upper openings of such hoppers rotating below the discharge point of the conveyor means 1 or across the respective vibratory chute. Thus, upon rotation of the roof, all hoppers 25 may be filled in the desired manner and in succession in response to a not illustrated (filling) level detector, wherein the rotary roof during the filling operation is either stationary or may be rotatingly advanced, provided that the discharge point of the conveyor means 1 is hereby positioned above the upper opening of the respective hopper 25 to be charged.

The batch material then passes through the lower openings of hoppers 25 via fixedly adjusted conveyor means to the various openings 28 provided in the rotary roof such that rotatable or movable conveyor means are no longer required. Delivery can be effected in this case solely in response of level detectors provided in the upstream tank bins or directly in accordance with a program, respectively, such that mechanical trouble is avoided.

Depending on the spacing of the lower openings of the hoppers 25 from the openings 28 in the rotary roof either a covered vibratory chute 26 may be used as the conveyor means, or the batch material is fed, from the hoppers 25 to the vibratory chutes 26 through vibratory pipes or tubes 27.

Now, the respective quantity delivered to each opening 28 in accordance with the position of the rotary roof or during one revolution, respectively, may be adjusted by actuating the vibratory chutes 26 or tubes 27, particularly by adjusting the period of operation thereof.

The openings 28 formed in the rotary roof are of rectangular configuration and of such a width that these openings in their entirety span the full radial extension of the roof. More particularly, the circle described by the edge of each opening abuts the circle described by the edge of each adjacent opening.

In order to further improve the metering of the quantities, in addition to the timed control of each of the metering vibratory chutes it is also possible, in a manner being obvious to the expert, to effect quantity control by means of vibration of these chutes.

In order to prevent the central conveyor means 1 or the respective vibratory chute filling the hoppers 25 through a dropping tube 34, from discharging into the space between the separate hoppers 25, these hoppers have their upper openings provided with an upwardly extending, common filling ring 31 which, in turn, is covered at its upper side by a cover 29 connected to the supporting frame. Thus, relative rotary movement takes place between the cover 29 and the filling ring 21, such that sealing means provided between these two portions must be adapted to allow for such movement. As the cover 29 is stationarily mounted to the supporting frame, a dropping tube or pipe 34 may be disposed between the vibratory chute 1 and the cover 29 so as to permit the batch material to be fed into the hoppers 25 in dust-tight and gas-tight fashion.

As the vibratory chutes 26 and the openings 28 are furthermore provided with suitable covers, the construction provides for dust-tight and gas-tight conveyance of the batch material from the main batch bin 20 to space below the rotary roof 18.

The sealing means between the cover 29 and the filling ring 31 are similar to that provided between the rotary roof and the supporting frame 13; an edge or marginal channel 32 of the filling ring 31 arranged on opposite sides of the filling ring 31 and filled with a flowable or fluid, heat resistant material 33, has extending thereinto the lower rim or edge of depending webs 30 mounted to the cover 29.

Accordingly, since the rotary roof according to the invention combines maximum reliability of functioning with optimum metering of the batch material and gas-tight closure of the upper furnace space and of the batch material supply, it may be spoken of as an ideal solution to the existing problems.

What we claim is:

1. A glass melting furnace comprising: a wall of refractory material having a regular cross section; a cover disposed over the wall including at least one hopper thereon; means mounting the cover for rotation about a central point thereof and in a horizontal plane; means defining inlet ports in the cover disposed at different radial positions from the axis of rotation; means for feeding batch material into the hopper; and means receptive of the batch material from the hopper for effecting a controlled supply of the batch material into the inlet ports and thereafter into the furnace during rotation of the cover, wherein the supply means comprised movable outlet means mounted on the cover for movement thereof to each inlet port during rotation of the cover.

2. The glass melting furnace according to claim 1 wherein the cover further comprises cooperating with a sealing edge at the crown of the wall.

3. The glass melting furnace according to claim 2, wherein said sealing edge has a U-shaped configuration, said sealing edge being filled with a flowable or fluid sealing medium and the apron has a vertically extending rim immersed into said sealing medium.

4. The glass melting furnace according to claim 1, wherein the means mounting the cover comprises beams connected in a triangular configuration supporting the cover, including rollers in the corners thereof, with at least one of said rollers being driven, and an annular track rail on which said rollers rest.

5. The glass melting furnace according to claim 1, further comprising central power supply means arranged in concentric relation to the axis of rotation of said cover, said power supply means passing through said hopper up to the upper side of said cover.

6. The glass melting furnace according to claim 1, wherein said rotary roof has arranged on a circle concentric with the axis of rotation thereof a plurality of hoppers, the upper openings of which rotate below and across the lower discharge position of said feeding means.

7. The glass melting furnace according to claim 6, wherein said hoppers are provided with a level detector delivering a signal to initiate refilling when the upper opening of the respective hopper is positioned below the discharge position of said supplying means.

8. The glass melting furnace according to claim 6, wherein said rotary roof is provided with a plurality of inlet ports each adapted to be fed by the supplying means which have their charge ends disposed below the lower openings of each hopper.

9. The glass melting furnace according to claim 8, wherein the inlet ports have a radial extension such that during rotation the circle described by the edge of each port abuts the circle described by the edge of each adjacent port.

10. The glass melting furnace according to claim 8, wherein the supplying means comprises vibratory tubes connecting the lower ends of said hoppers and the inlet ports.

11. The glass melting furnace according to claim 10, wherein said hoppers have their upper openings upwardly continuing into a common filling ring closed at its upper side by a circular cover and which includes opposite, depending webs spaced from said filling ring and overlapping the latter in downward direction.

12. The glass melting furnace according to claim 11, wherein said filling ring includes on both edges a marginal channel which is filled with a flowable or fluid material, with the lower edges of said webs being immersed into said material.

13. The glass melting furnace according to claim 12, wherein a dropping tube is provided between said feeding means and said circular cover.

14. The glass melting furnace according to claim 13, wherein said vibratory tubes are covered and open into covers on said ports.

15. The furnace according to claim 1, wherein the inlet ports are disposed along one radius and wherein the outlet measn is movable along said one radius during rotation of the cover.

16. The glass melting furnace according to claim 15, wherein the hopper is concentrically positioned on said cover and includes an outlet opening eccentrically arranged adjacent the axis of rotation and wherein the movable outlet means comprises at least one distributor chute having a charging opening below the outlet opening and a discharging opening movable along the radius.

17. A glass melting furnace comprising: a wall of refractory material having a regular cross section; a cover disposed over the wall including at least one hopper thereon; means mounting the cover for rotation about a central point thereof and in a horizontal plane; means defining inlet ports in the cover disposed at different radial positions from the axis of rotation; means for feeding batch material into the hopper; and means receptive of the batch material from the hopper for effecting a controlled supply of the batch material into the inlet ports and thereafter into the furnace during rotation of the cover, wherein the inlet ports are disposed along a sector of a circle which traverses the radius of the wall cross section and wherein the supply means comprises an outlet member pivotable around the center of the circle with an outlet port disposed at the circle sector and movable therealong during rotation of the cover.

18. A glass melting furnace comprising: a wall of refractory material having a regular cross section; a cover disposed over the wall including a least one hopper thereon; means mounting the cover for rotation about a central point thereof and in a horizontal plane; means defining inlet ports in the cover disposed at different radial positions from the axis of rotation; means for feeding batch material into the hopper comprising a batch main bin eccentrically mounted and the lower end of said bin carrying metering conveyor means the discharge portion of which is disposed above the upper opening of said hopper; and means receptive of the batch material from the hopper for effecting a controlled supply of batch material into the inlet ports and thereafter into the furnace during rotation of the cover, wherein the cover comprises a plurality of upstream tank bins having their upper openings positioned below the path of travel of the discharge position of the supplying means and having their lower openings connected through hoppers to conveyor means each operable to discharge the material into the slot or openings provided in said cover and wherein said openings and said associated upstream tank bins are arranged on a radially extending sector of a circle, with a vibratory chute mounted for rotation in a horizontal plane extending from the center of said sector to said bins, with a vibrator tube or pipe discharging onto said bins in the center of rotation of said chute, and with the batch material being supplied to the opposite end of said tube or pipe by said hopper.

* * * * *